United States Patent
Ruoppolo

(10) Patent No.: US 7,729,823 B2
(45) Date of Patent: Jun. 1, 2010

(54) METHOD AND SYSTEM FOR MONITORING TYRES

(75) Inventor: Roberto Fernando J. Ruoppolo, Sao Paulo (BR)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/432,887

(22) PCT Filed: Nov. 23, 2001

(86) PCT No.: PCT/EP01/13668

§ 371 (c)(1),
(2), (4) Date: Nov. 24, 2003

(87) PCT Pub. No.: WO02/44957

PCT Pub. Date: Jun. 6, 2002

(65) Prior Publication Data

US 2004/0073339 A1    Apr. 15, 2004

Related U.S. Application Data

(60) Provisional application No. 60/251,422, filed on Dec. 6, 2000.

(30) Foreign Application Priority Data

Nov. 30, 2000   (EP) .................................. 00126149

(51) Int. Cl.
*G06F 19/00* (2006.01)
*G08B 26/00* (2006.01)

(52) U.S. Cl. ............................. 701/30; 701/33; 73/146; 340/505

(58) Field of Classification Search .................. 701/29, 701/30, 33; 73/146; 180/311; 345/326–335; 340/442, 448, 447, 505
See application file for complete search history.

(56) References Cited

U.S. PATENT DOCUMENTS

| 4,773,011 A | 9/1988 | VanHoose |
| 4,862,486 A | 8/1989 | Wing et al. |
| 5,166,676 A * | 11/1992 | Milheiser .................. 340/10.34 |

(Continued)

FOREIGN PATENT DOCUMENTS

EP    0613794 A1    9/1994

(Continued)

*Primary Examiner*—Khoi H. Tran
*Assistant Examiner*—Ronnie Mancho
(74) *Attorney, Agent, or Firm*—Finnegan, Henderson, Farabow, Garrett & Dunner, L.L.P.

(57) ABSTRACT

A method for monitoring a tire fitted to a vehicle includes detecting data from the tire, sending the data to a central processing unit using a predetermined telecommunications protocol, causing automatic processing of the data by the central processing unit to obtain at least one value for an index characterizing the tire during use of the tire, and sending the at least one value to a receiving unit. The data from the tire includes a code identifying the tire and at least one item of data regarding a state of the tire. A system for monitoring a tire includes a device for detecting data from the tire and a central processing unit. The central processing unit causes automatic processing of the detected data and generates at least one value for an index characterizing the tire during use of the tire.

25 Claims, 3 Drawing Sheets

U.S. PATENT DOCUMENTS

| | | |
|---|---|---|
| 5,454,411 A | 10/1995 | Weyrich et al. |
| 5,731,754 A | 3/1998 | Lee, Jr. et al. |
| 5,737,215 A | 4/1998 | Schricker et al. |
| 6,034,676 A * | 3/2000 | Egan et al. .................... 701/29 |
| 6,107,917 A * | 8/2000 | Carrender et al. ........... 340/505 |
| 6,271,748 B1 * | 8/2001 | Derbyshire et al. ......... 340/442 |
| 6,826,951 B1 * | 12/2004 | Schuessler et al. ............ 73/146 |
| 2002/0075145 A1 * | 6/2002 | Hardman et al. ............ 340/442 |
| 2005/0016787 A1 * | 1/2005 | Lesesky et al. .............. 180/311 |

FOREIGN PATENT DOCUMENTS

| | | |
|---|---|---|
| WO | WO 01/62525 A1 | 8/2001 |

* cited by examiner

METHOD AND SYSTEM FOR MONITORING TYRES

CROSS-REFERENCE TO RELATED APPLICATIONS

This application is a national-phase entry under 35 U.S.C. §371 from International Application No. PCT/EP01/13668, filed Nov. 23, 2001, in the European Patent Office, the contents of which are relied upon and incorporated herein by reference; additionally, Applicants claim the right of priority under 35 U.S.C. §119(a)-(d) based on patent application No. 00126149.4, filed Nov. 30, 2000, in the European Patent Office; further, Applicants claim the benefit under 35 U.S.C. §119(e) based on provisional application No. 60/251,422, filed Dec. 6, 2000, in the U.S. Patent and Trademark Office.

BACKGROUND OF THE INVENTION

1. Field of the Invention

The present invention relates to a method and a system for monitoring tyres fitted to vehicles, during use thereof. This monitoring is performed by processing data detected on the tyre so as to obtain behavioural indices which can be associated with the working life of said tyre.

2. Description of the Related Art

The patent U.S. Pat. No. 5,737,215 describes a method and an apparatus for comparing with each other vehicles forming part of a fleet, whereby an apparatus compares various characteristics of the vehicles in a fleet so as to produce a signal indicating a deviation from a predefined reference value. This signal is designed to determine which components of the vehicles are not functioning or do not comply with the normal operating specifications. A predefined database is used as a device for comparing the parameters representing said vehicle characteristics. Said parameters consist of three types: values detected by sensors, values calculated by means of functions and values indicating a deviation from values detected by sensors.

The patent U.S. Pat. No. 4,773,011 describes a method for monitoring, selecting and evaluating vehicle tyres. In particular, this patent describes a method for monitoring the state of tyres fitted to vehicles in order to manage in an optimum manner tyres used by fleets of vehicles, for example lorries. A computer analyses information relating to the tyres of each vehicle in the fleet in order to check for example the wear thereof. In this patent, this information consists of the inflation pressure and the depth of the grooves in the tread band. The data may be processed in a microcomputer, one of which is present in each vehicle, or processed in a central computer. Among the various functions the system also calculates the cost per kilometer of the tyres.

U.S. Pat. No. 4,862,486 describes a revolution counter associated with a tyre. In particular, the patent describes a piezoelectric sensor associated with the tyre, able to emit an electric signal during each revolution of the tyre when the latter makes contact with the ground. This signal is processed and sent to a counter which determines the number of rotations performed by the tyre. The sensor is designed to determine the number of kilometers travelled by the tyre during its working life.

A tyre basically consists of a torus-shaped carcass generally comprising at least one reinforcing ply provided with textile or metallic cords lying in the radial planes, i.e. containing the axis of rotation of the tyre. The ends of the carcass ply are preferably folded back, axially outwards from the inside, around two metal annular cores—usually called "bead wires"—which form the reinforcement for the beads, namely the radially internal ends of said tyre. The beads allow assembly of the tyre on a corresponding mounting rim.

A tread band is positioned on the peripheral rim of said carcass and has, formed in it, a tread pattern by means of which the tyre makes contact with the ground. The tread band has a thickness of predetermined value and is defined between an outer surface, intended to make contact with the ground, and an inner surface, preferably lined with a thin fixing layer ("liner") designed to ensure the necessary adhesion between the material of the tread band and that of a belt assembly. The abovementioned belt assembly is an annular reinforcing structure which is circumferentially unextendable and arranged between the carcass and the tread band. Generally the belt structure comprises at least two radially superimposed layers of rubberized fabric provided with metal reinforcing cords. In each layer said cords are arranged parallel to each other and intersecting with respect to the cords of the adjacent layers; preferably, the cords in said layers are also arranged symmetrically inclined with respect to the equatorial plane of the tyre. Preferably, the belt structure also comprises a further, radially external, layer of cords oriented circumferentially with respect to the tyre, usually known as 0° cords.

A tyre of this type is described in the patent application EP 613 794 in the name of the same Applicants.

Tyres for heavy vehicles, such as road haulage vehicles, vehicles used for quarry and construction work, coaches for transporting persons, etc., constitute a significant proportion of the vehicle management costs, with the result that it is currently the practice to replace the totally worn tread band with a new tread band by means of a process which is generally called "remoulding". Preferably, this process envisages the removal of the remainder of a worn tread band and, after a visual analysis of the tyre carcass in order to check its condition, the deposition of a new tread band. If the new tread band consists of unprocessed material, the carcass thus lined is inserted into a vulcanization mould where moulding of the tread band and vulcanization of the new band on the old carcass is performed. Alternatively, tread bands which are pre-moulded with a suitable tread pattern and pre-vulcanized may be used and in this case are bonded to the old carcass using suitable adhesives.

In the case of the abovementioned vehicles the new tyres are generally mounted on the front steering axles, whereas the remould tyres are mounted on the driving or driven rear axles and the trailer axles.

For example, in the case of a heavy vehicle comprising an engine cab with a front steering axle, a first rear driving axle, a second rear idle axle and a trailer, the tyres are arranged as follows:

- new tyres are mounted on the front steering axle;
- tyres which have been remoulded once are mounted on the rear axles;
- tyres which have been remoulded more than once are mounted on the trailer axles.

On the basis of this type of use of the tyres, the costs per kilometer of the tyre and the probable residual working life may vary considerably from tyre to tyre: monitoring this situation constitutes a problem for a vehicle fleet manager which becomes increasingly complex with an increase in the number of vehicles in the fleet and which requires, among other things, the management of a suitable stock of spare tyres.

SUMMARY OF THE INVENTION

For the purposes of the present invention, the state of the tyre is defined by:
- the number of tread band remoulds carried out on the carcass of said tyre;
- the number of kilometers travelled by each tread band remoulded on that tyre;
- the number of kilometers travelled by the tyre carcass as a whole;
- the positions assumed, during use, by the tyre fitted to the vehicle (typically FL=a front left axle; FR=front right axle; RL=rear left axle; RR=rear right axle, etc.).

The Applicants have noted that, if the tyres are made identifiable, each having for example a respective code, information concerning the state of tyres fitted to vehicles in a fleet may be used in order to obtain information which is useful for management of the fleet.

In particular, the supplier of these tyres may use this information to determine economic indices which characterize the working life of the tyres, such as the cost per kilometer, rapidity of wear and the residual working life thereof.

The Applicants have found that, by detecting on the tyres of vehicles belonging to a fleet of different or similar composition information regarding the state of these tyres and sending this information to a processor which determines these indices, it is possible to optimize management of the tyre supplies for these fleets. The information regarding the state of the tyres may be exchanged with the tyre supplier who, by incorporating this information into other data already possessed, is able to calculate said indices in real time. These indices may be exchanged with the fleet manager who is thus supplied with the data required for management, without being burdened by the task of collecting data and calculating said indices. This allows the fleet manager to replace tyres which are at the end of their working life without having to maintain a large stock, being able to operate with only a limited number of spare tyres, and allows the tyre manufacturer to select the product which is most suitable for the vehicle fleet manager and to programme the replacement of tyres which are nearing the end of their working life.

Preferably, the communication and exchange of information between the fleet manager and the tyre manufacturer is performed on-line. This also allows the fleet manager to place purchase orders on-line and to receive and transmit corresponding information to the fleet manager in real time.

According to a first aspect thereof, the present invention relates to a method for monitoring a tyre fitted to a vehicle, characterized in that it comprises the following steps:
- detecting data from said tyre, comprising:
  - a code identifying said tyre;
  - at least one item of data regarding the state of said tyre;
- sending said data to a central processing unit by means of a predetermined telecommunications protocol;
- causing automatic processing of said data by said central processing system so as to obtain at least one value for an index characterizing the tyre during use;
- sending the value of said at least one index to a receiving unit.

Preferably, said value of a characteristic index comprises the operating cost of said tyre.

Preferably, said step of performing automatic processing of said data comprises the step of decoding said data.

Preferably, said information regarding the state of the tyre comprises the number of kilometers travelled by said tyre.

In particular, said tyre detection step comprises the steps of:
- detecting information regarding the number of kilometers travelled by said vehicle;
- associating said number of kilometers detected with said vehicle tyre.

Preferably, said step of detecting data from said tyre comprises the step of decoding said data in a local processing unit connected to said central processing unit by means of said predetermined telecommunications protocol.

Preferably, said receiving unit is said local processing unit.

In particular, said step involving decoding of said data involves:
- comparing said detected data with information contained in a database;
- updating said database with the data detected.

According to a further aspect thereof, the present invention relates to a system for monitoring a tyre, characterized in that it comprises:
- a device for detecting data from said tyre, comprising:
  - a code identifying said tyre;
  - at least one item of data relating to the state of said tyre;
- a central processing unit able to perform automatic processing of said data and generate the value of at least one index characterizing the tyre during use.

Said system further comprises a local processing unit able to decode said data and transmit said decoded data to said central processing unit by means of a telecommunications network.

Preferably, said information regarding the state of the tyre comprises:
- number of tread band remoulds carried out on the carcass of said tyre;
- number of kilometers travelled by each tread band remoulded on the carcass of said tyre;
- number of kilometers travelled by the carcass of said tyre as a whole.

Said system further comprises a database in which parameters comprising the following are stored:
- number of tread band remoulds carried out on the carcass of said tyre;
- cost of remoulding the tyre;
- number of kilometers travelled by each tread band remoulded on that tyre;
- number of kilometers travelled by the tyre carcass as a whole;
- position of the tyre on the vehicle.

Preferably, said detection device comprises:
- a control unit arranged on said vehicle and communicating with devices for detecting the number of kilometers of said vehicle;
- a sensor inserted in said tyre.

Preferably, said database is present in said central processing unit.

Alternatively, said database is present in said local processing unit.

Alternatively, said detection device comprises a sensor which is inserted in said tyre and which includes a device for counting the number of kilometers travelled by said tyre.

In particular, said sensor comprises a device for storing this data detected.

BRIEF DESCRIPTION OF THE DRAWINGS

Further characteristic features and advantages of the present invention will emerge more clearly from the following description, with reference to the accompanying drawings which are provided solely by way of explanation and are not intended to be limiting in any way and in which.

DETAILED DESCRIPTION OF THE EMBODIMENTS

The method and the system according to the present invention are intended, preferably, for vehicle fleet managers who have to monitor the tyres of all the vehicles in a fleet in order to check their actual wear and optimize the costs of managing these tyres.

At the same time, the present invention is intended for a tyre manufacturer or a tyre distributor who may select, from among the tyres to be produced or distributed, those which are most suitable for each vehicle in a fleet of similar or different composition, depending on the specific use of the vehicle.

Figure 1:
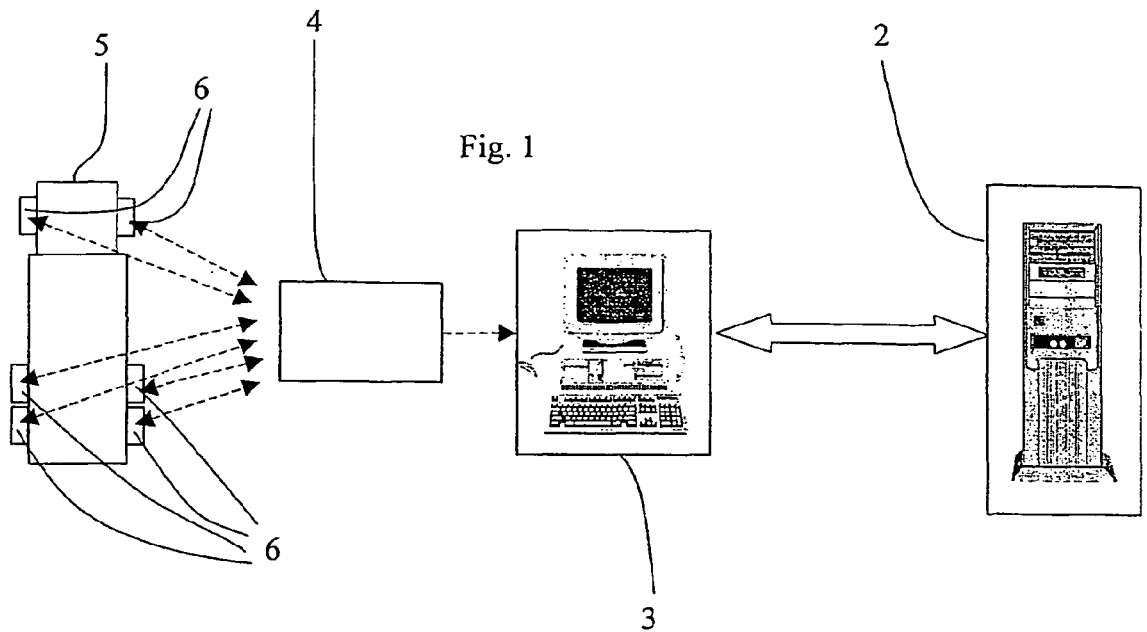
FIG. 1 shows a system for monitoring tyres fitted to vehicles, according to the present invention.

The vehicles in a fleet generally occupy suitable spaces where they are parked in between journeys. Usually, in these spaces, also called "parking areas", the ordinary and extraordinary maintenance operations on these vehicles, such as all the operations involving the tyres—for example replacement and changing the position of the tyres on the vehicles—are performed. FIG. 1 shows an example of a system for monitoring tyres preferably comprising a central processing unit 2 and a data receiving station 4. The system further comprises at least one local processing unit 3.

Moreover, FIG. 1 shows schematically a vehicle 5 fitted with tyres 6 from which information regarding the state of these tyres is obtained.

In accordance with the present invention, the central processing unit and the local processing unit communicate with each other by means of a public line (Internet) or private line (dedicated line), i.e. by means of a telecommunications network which links up the two processing units.

The receiving station 4 communicates with the local processing unit 3 and is designed to receive the information detected on the tyres 6 of the vehicle 5 and make it available in said unit.

In accordance with the present invention, these local processing units and this receiving station 4 are preferably arranged in these parking areas. The central processing unit 2 is preferably associated with the tyre manufacturer or distributor.

The system also comprises a device for detecting data from the tyres of vehicles in the fleet; said information relating to the state of the tyre is obtained from said data.

Said device comprises a sensor preferably arranged in each tyre of the vehicle and able to detect this data from the type.

Advantageously, this device is also designed to transmit this data to said receiving station 4.

Preferably, said detected data comprises:
a code identifying the tyre;
number of remoulds carried out on the tyre;
number of kilometers travelled.

The sensor comprises a storage device in which, preferably upon insertion of the sensor inside the tyre, said identification code CI, which is unique for each tyre, is stored. For example, this code identifying the tyre CI comprises information concerning:

1. structure of the carcass C of the tyre;
2. tread pattern B of the tyre;
3. size M of the tyre;
4. factory F where the tyre was produced;
5. date of manufacture D of the tyre;
6. maximum load X which can be withstood by the tyre;
7. maximum speed V at which the tyre can operate.

Moreover, the sensor preferably has inside it a code identifying an integrated circuit used therein.

This sensor is preferably of the passive type, i.e. is powered by an external signal, preferably by a radiofrequency signal. Alternatively, this sensor may be powered by means of a long-life battery arranged inside it.

The identification code is, for example, represented by a plurality of bits which are transmitted preferably at the start of the sequence for transmission of the data to the receiving station 4.

Information regarding the tyre during its working life is added to said identification code. For example, it is possible to store information concerning remoulding of the tyre. Said code has, associated with it, a further field which contains the number of remoulds carried out on the tyre NR (for example, a pair of additional bits associated with the code) and which comprises information indicating whether or not the tyre has been remoulded. These bits, when the sensor is inserted into a new tyre, are preferably empty or more generally contain information indicating a "new tyre" (for example the digits "00").

When the tyre is remoulded for the first time, the information "first remould" (for example "01") is inserted in these bits. Following a further remould, the information "second remould" (for example "10") is inserted in these bits. Following yet another remould, the information "third remould" (for example "11") is inserted in these bits.

In the case where the number of remoulds is greater than three it is possible to use another bit in order to code these further remoulds.

Inside each sensor, in particular in said storage device, this identification code CI is stored, having, associated with it, the information concerning the number of remoulds NR.

The memory locations associated with the code CI and the information NR are preferably of the read-only type. These locations may be modified preferably only when each remould is performed and at the end of the working life of the tyre. In this case, the sensor may if necessary be reused in order to be inserted in a new tyre, these memory locations are erased and the code of the new tyre is inserted in them.

Storage of the identification code and the number of remoulds in the sensor is preferably performed by means of said receiving station 4 which is controlled by said local processing unit 3 and which sends to the sensor a command storing the identification code and the number of remould operations.

The storage device further comprises a plurality of rewritable memory locations in which it is possible to store the detected data from the tyre.

The receiving station 4 is preferably a fixed station arranged inside said areas for parking the fleet vehicles; the detection of the data on the tyres may be performed in a predetermined position of the parking area where the receiving station is located advantageously at a short distance from the tyres of the vehicle, said data of which is to be detected.

Detection of the data may be performed at predefined events. Some examples of these predefined events are listed below:

whenever the vehicle returns from a trip;
after a fixed number of journeys;
after a predetermined number of days.

Depending on the event, from said events, for which detection of the data on the tyres is performed, the value of the number of kilometers travelled KR assumes a different meaning. In all cases, the number of kilometers travelled in total by the tyre is the sum of all of the values detected.

Figure 2:
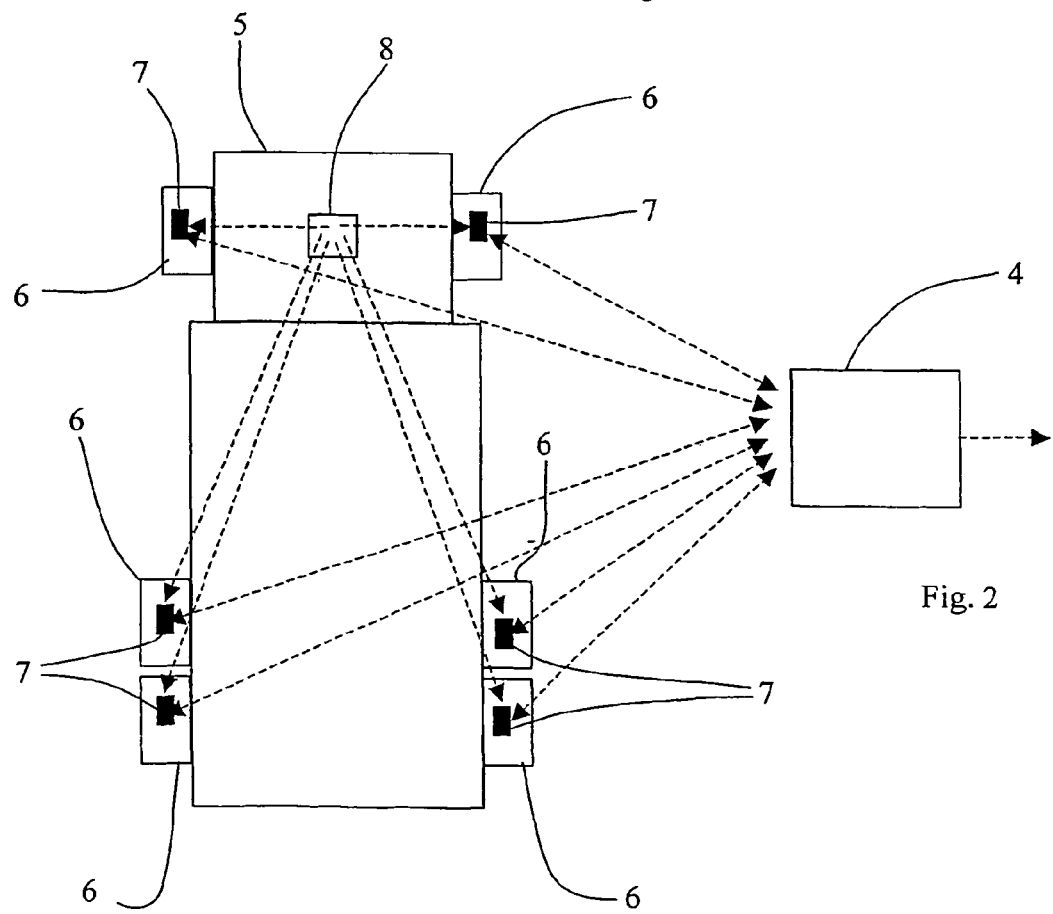
FIG. 2 is a schematic illustration of the system for transmitting data from tyres fitted to a vehicle, according to a first embodiment of the present invention.

FIG. 2 is a schematic representation of a first embodiment of said device for detecting the data from the tyres.

Said device comprises a control unit 8 which is preferably installed in said vehicle and which communicates with said sensors 7 and with devices for detecting the number of kilometers travelled, present on the vehicle.

The sensors 7 communicate with said control unit, for example, by means of radiofrequency signals. The control unit transmits signals preferably in the form of electromagnetic waves at a short-wave radiofrequency, in a range of frequencies lying between, for example, 100 kHz and 1000 MHz, and even more preferably in digital form. These electromagnetic waves contain information relating to the number of kilometers travelled by the vehicle and consequently the tyres.

The sensors 7 in the tyres 6 transmit information regarding the state of the tyre to said receiving station 4 by means of signals in the form, for example, of radiofrequency electromagnetic waves.

The transmission sequence of this embodiment of the present invention occurs in the manner described below. When it is decided to detect the data from the vehicle, the vehicle is brought into said predetermined position in the parking area. Preferably, the measurement is performed by the receiving station, which enables the control unit in the vehicle by means of a radiofrequency signal. Alternatively, said control unit may be enabled manually in the vehicle without the intervention of the receiving station.

Preferably, said control unit enables the sensors 7, sending a radiofrequency signal to them; this signal is, for example, a digital signal also comprising the number of kilometers travelled in coded form.

Inside each sensor, in particular in the storage device, the abovementioned identification code CI with the associated information on any remoulds NR of the tyre is stored. The number of kilometers travelled KR obtained from said signal sent by the control unit of the vehicle is associated in the abovementioned rewritable memory locations inside the sensor.

Each sensor 7 of the vehicle in turn sends a radiofrequency signal to the receiving station 4 comprising its identification code CI of the tyre, the indication as to whether the tyre is a new tyre or remould NR and the number of kilometers travelled KM.

Figure 3:
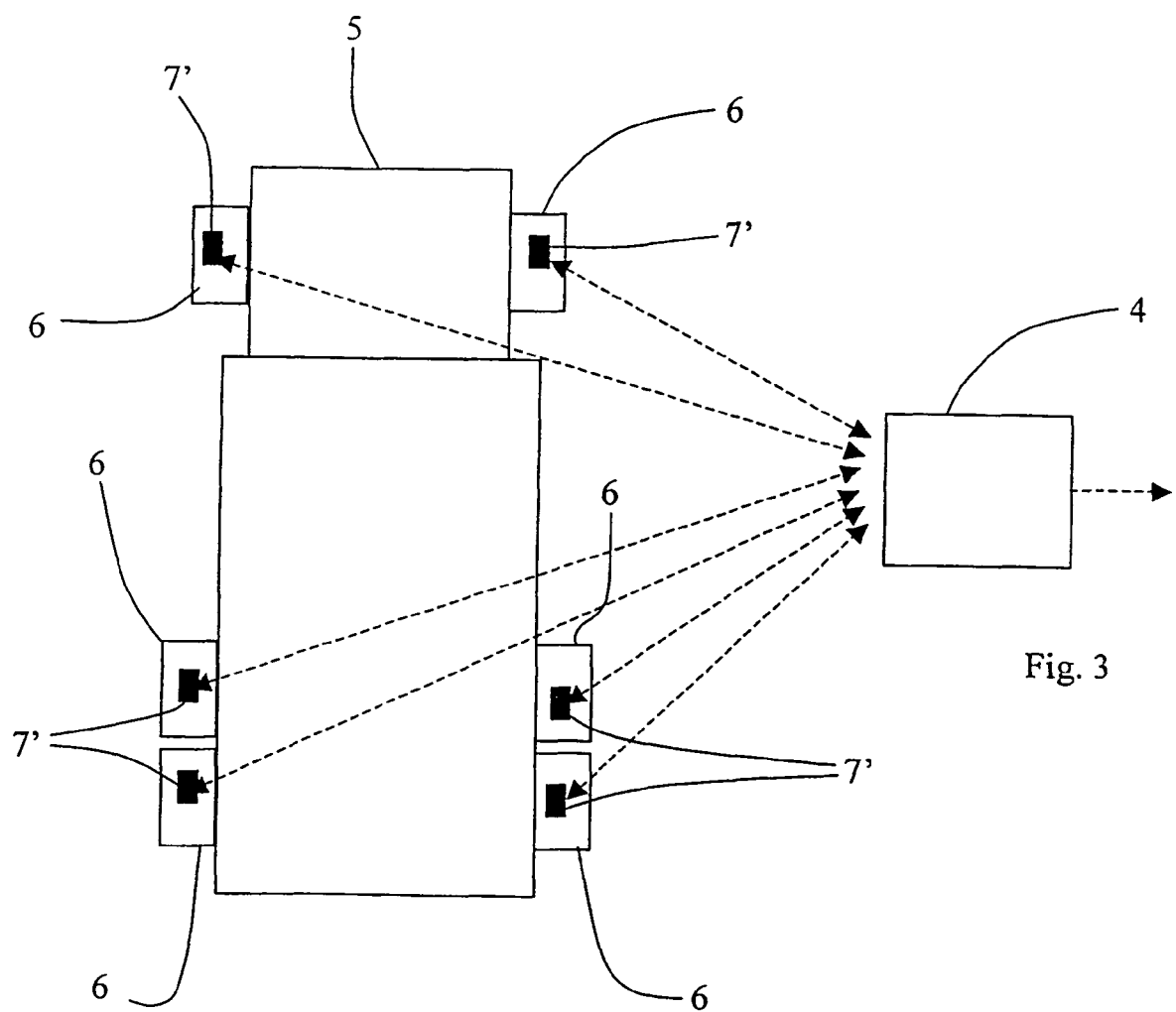
FIG. 3 is a schematic illustration of the system for transmitting data from tyres fitted to a vehicle, according to a further embodiment of the present invention.

FIG. 3 is a schematic illustration of a further embodiment of said device for detecting the data from the tyres.

In particular, the device comprises a sensor 7' designed to detect the data from said tyre. The sensor is advantageously also designed to transmit the data regarding the state of the tyre to the receiving station 4.

This sensor 7' is preferably of the passive type, i.e. is powered by an external signal, preferably a radiofrequency signal. Alternatively, this sensor may be powered by means of a long-life battery arranged inside it.

The sensors 7' communicate with said receiving-station 4, for example, by means of radiofrequency signals. The sensors preferably transmit signals in the form of electromagnetic waves at a short-wave radiofrequency, in a range of frequencies lying between, for example, 100 kHz and 1000 MHz, and even more preferably in digital form. These signals contain information relating to the number of kilometers travelled by the vehicle and consequently the tyres.

Each sensor 7' inside its tyre comprises a storage device in which the abovementioned unique code CI identifying the tyre is stored.

This code is, for example, a digital code which is preferably stored in the sensor upon insertion of said sensor inside the carcass of the tyre. The code is, for example, formed by a plurality of bits which are preferably transmitted at the start of the sequence for transmission of the data from each sensor 7' to the receiving station 4.

The information relating to the remoulds carried out on the tyre is added to said identification code, as described above.

This identification code CI together with the associated information on any remoulds NR is stored in this storage device.

The memory locations associated with the code CI and the information NR are preferably of the read-only type.

These locations may be modified preferably only when a remould operation is carried out and at the end of the working life of the tyre. In this case, the sensor may be reused if necessary in order to be inserted in a new tyre, these memory locations are erased and the code of the new tyre is inserted in them.

The storage of this data in the sensor 7'—identification code and number of remoulds (CI+NR)—may be performed by means of said receiving station 4 which, by means of a suitable radiofrequency signal, sends the data and a command for storing said data to the sensor.

In this embodiment of the present invention, the storage device further comprises a plurality of rewritable memory locations with which the detected data from the tyre is associated.

In this embodiment of the present invention, the sensor comprises, inside it, a device for counting the number of kilometers travelled by the tyre in which said sensor is inserted. This device is preferably activated by the movement of said tyre and the kilometers travelled KM are obtained from the number of revolutions performed by the tyre. The data regarding the number of kilometers travelled KM is stored in said rewritable memory locations.

The transmission sequence of this embodiment of the present invention occurs, for example, in the manner described below.

When it is decided to detect the data from the vehicle, said vehicle is brought into said predefined position in the parking area. Preferably, measurement is performed by the receiving station which enables the sensors 7' to transmit the data contained in the storage device preferably by means of a radiofrequency signal.

In both the embodiments, the sensor 7 or 7' is advantageously inserted in the tyre carcass so that any remoulding of the tyre tread band does not result in removal of said sensor.

The signal sent by the sensors 7 or 7' to the receiving station 4 is then preferably sent to the local processing unit 3.

The data contained in this signal and therefore, generally, the data detected on the tyres comprises the identification code CI, the number of remoulds NR and the number of kilometers travelled KM.

The system also comprises a database in which all the identification codes of the tyres are stored and, for each identification code, parameters are stored in corresponding characteristic fields, such as, for example:

the number of tread band remoulds carried out on the carcass of the tyre NRE;

the cost of remoulding the tyre CR;

the number of kilometers travelled by each remould tread band on that tyre KMB;

the number of kilometers travelled by the tyre carcass as a whole KMT;

the position P in which the tyre has been fitted to the vehicle (left front axle LF, right rear axle RR, etc.);

additional information such as, for example, the cost of any additional repairs carried out on the tyre, dates of remoulding carried out on the tyre, end-of-use date of the tyre, duration of use, etc.

Whenever a new tyre provided with a sensor is fitted to a vehicle in the fleet, the system generates a new identification code which is stored in the sensor by means of the receiving station. Similarly, the system inserts the new code in the database and associates, with it, the information relating to the number of kilometers and the number of remoulds (example: remoulds carried out NR=0; kilometers travelled by said tread band KMB=0; number of kilometers travelled by the carcass KMT=0; vehicle V="x"; and front axle AA).

Figure 4:
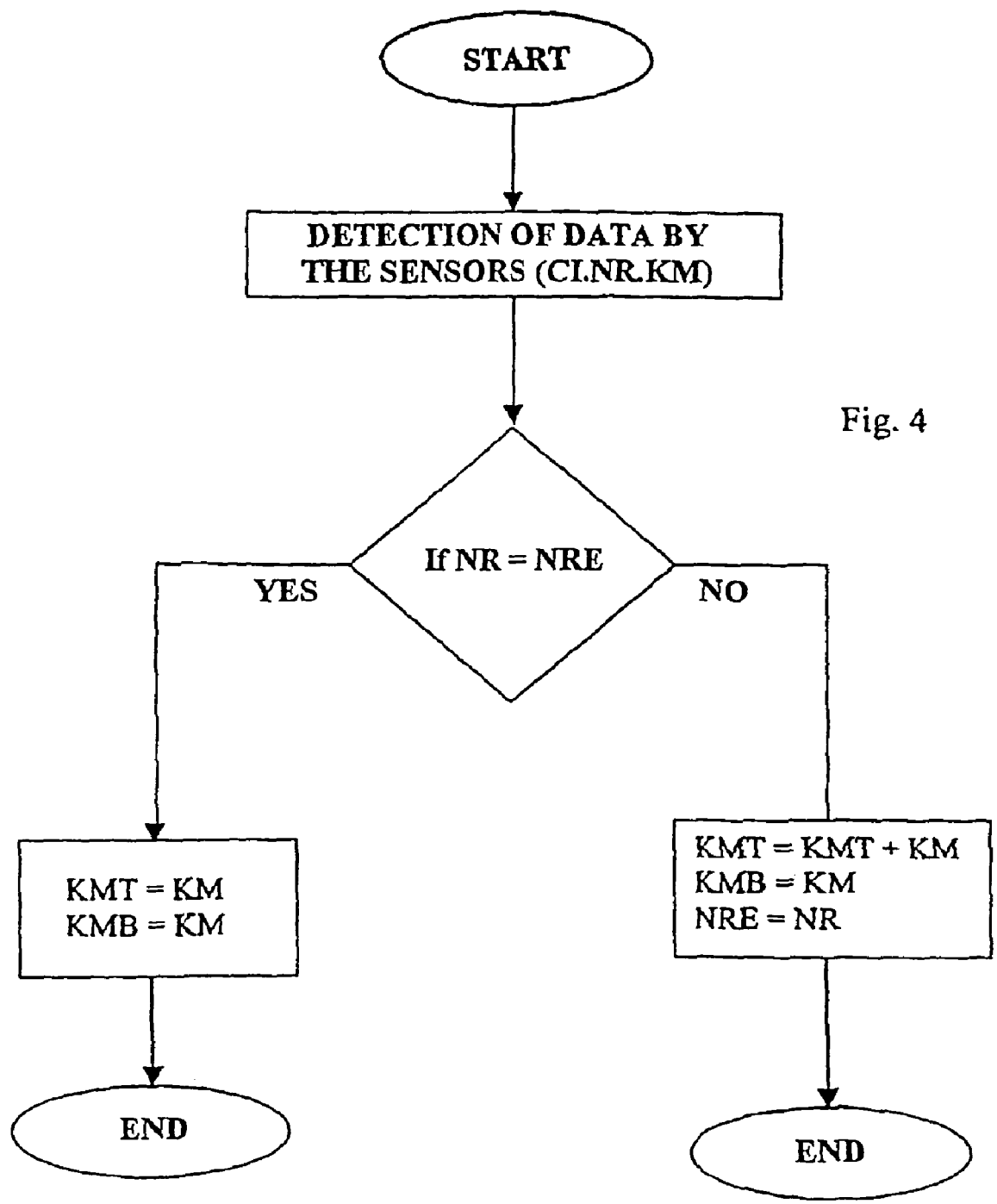
FIG. 4 shows a flow diagram illustrating processing of the data received from the tyres of a vehicle.

Preferably, whenever detection of a vehicle is performed, the data detected is decoded so that this database is updated with the new data detected. In particular, the identification code of the tyre received from the sensors allows a search, inside the database, for the position of the data associated with this code. The parameters are updated, for example, on the basis of the following criteria illustrated in the flow algorithm in FIG. 4.

For the purposes of the present invention, the term "data decoding" is understood as meaning comparing the data detected with the data present in said database and subsequent updating of said database. In particular, for each sensor the data relating to the remoulds NRE./present in the database is compared with the data NR detected by said sensor;

if the values coincide, the value of the number of kilometers travelled by said tread band KMB, present in the database, is replaced by the data detected by the sensor KM and the value of the total number of kilometers travelled by the tyre carcass KMT, present in the database, is replaced by the data detected by the sensor KM;

if the values do not coincide, remoulding of the tyre has been carried out; therefore, the number of remoulds is updated, replacing the value present in the database NRE with that detected NR, the value of the number of kilometers travelled by said tread band KMB present in the database is replaced by the data detected by the sensor KM, and the value KM of the number of kilometers detected is added to the value of the total number of kilometers KMT travelled by the tyre carcass, present in the database.

According to a first embodiment of the invention, this database is preferably present in said central unit and the data detected is sent directly to said central unit by means of said local processing unit. In this case, the abovementioned data decoding is performed in the central processing unit.

According to a further embodiment of the invention, this database is preferably present in said local processing unit. In this case, data decoding is performed in said local processing unit and the decoded data, i.e. said updated parameters contained in the database, are sent to said central unit.

For the purposes of the present invention "sending said data to said central unit" is understood as meaning conveying the information contained in said data to said central unit by means of a predefined telecommunications protocol.

In both the abovementioned embodiments, communication between the fleet manager and the tyre manufacturer may be performed by means of a mask for entering said data and/or parameters, provided by the manager via the telecommunications network, for example in the form of a web page at an Internet web site. This web page is preferably entered in said central processing unit.

Said mask allows the introduction and storage of said data and/or parameters in an integrated form which can be immediately processed by the abovementioned central processing unit.

The entry mask preferably comprises one or more groups of mutually homogeneous fields in which the fleet manager is able to enter the data and/or parameters processed in said local processing unit.

By means of the abovementioned entry mask available to the fleet manager, the tyre manufacturer receives in real time the data and/or parameters relating to the tyres and is able to perform processing thereof in order to calculate characteristic indices of the tyres, by means of which it is possible to predefine the cost of managing said tyres.

Preferably, sending of the data and/or the parameters by the manager (which corresponds, for example, to one or more mouse clicks inside the web page provided) preferably initiates in real time the program for calculating the indices resident in the central processing unit.

The receiving of the parameters and/or data, whether it be performed by means of said entry mask or whether it be performed automatically by said local processing unit, causes the automatic processing thereof in the processing unit so as to obtain the values of said characteristic indices of the tyre during use. These parameters and/or data may be advantageously combined with further information contained in the central processing system.

For the purposes of the present invention, "causes automatic processing" is understood as meaning that the data received is processed in real time, i.e. the moment it is received.

In response to receiving the parameters and/or data and verification thereof, conveniently the processing unit of the manufacturer is able to generate information in response to the fleet manager, sending it, for example, by means of the same line or network from which the parameters and/or data was received, said response comprising, depending on the case in question, a plurality of indices. The response information may be sent in real time or subsequently, depending on the specific requirements.

This response information may be sent to the local processing unit which sent the data and/or to a receiving unit different from said local processing unit.

A series of examples of indices calculated in said central unit are listed below:

EXAMPLE 1

Index Representing the Cost Per Kilometer

This type of index allows estimation of the cost per kilometer travelled by a tyre provided with a sensor according to the present invention.

This index is calculated by adding together the cost for purchase of the tyre, the cost for remoulds carried out on the tyre and the cost for any repairs, divided by the total number of kilometers travelled by the carcass of that tyre.

The information regarding the number of kilometers travelled by the tyre carcass, the number of remoulds carried out on the tread band and the cost of any repairs to the tyre are supplied by means of the local processing unit of the manager. This index is useful for the fleet manager since it represents the main factor for decisions regarding the choice of tyre.

EXAMPLE 2

Tyre Remould Index

This type of index allows estimation of the average number of remoulds carried out for a model of tyre.

From information detected on the tyre, in particular the number of tread band remoulds carried out on the carcass of the tyre NRE, and the identification code of each tyre model CI, it is possible to calculate for each tyre model the average number of remoulds carried out. This index may provide an indication for the tyre manufacturer as to which models undergo the most remoulds. In this way, the tyre manufacturer is able to recommend tyre models with a high remould index to a fleet manager who has vehicles to which remould tyres may also be advantageously fitted.

EXAMPLE 3

Carcass Time Duration Index

This type of index allows estimation of the average duration, over time, of the carcass for a given tyre model.

From information detected on the tyre, in particular the date of manufacture, of the tyre D, and the end-of-use date of the tyre, it is possible to calculate for each tyre model the average duration, over time, of each tyre model.

EXAMPLE 4

Travel Wear Index (Kilometers Travelled×Time)

This type of index allows estimation of the kilometers travelled per unit of time for each tyre model.

From the information detected on the tyre, in particular the total number of kilometers KMT, the date of manufacture of the tyre and the end-of-use date, it is possible to calculate how many kilometers have been travelled by each tyre per unit of time. This value provides an indication as to the travel wear characteristic of each tyre.

These indices, in addition to being useful for management of a vehicle fleet, may also provide an indication to the vehicle manufacturer as to the most suitable tyres to be supplied to the fleet manager. In fact, for example in the case where the travel wear index is very high, i.e. the vehicles in a fleet travel a large number of kilometers in a short period of time, it may be assumed that a high-performance tyre is most suitable for that manager. A further example may be obtained from the carcass remould index. In the case where this index is high for all the vehicles belonging to a manager, it may be assumed, for example, that the tyres used by the vehicles belonging to that manager are subject to a limited amount of stress and that, therefore, several remould operations may be carried out on the tyre carcass. In this case, the tyre manufacturer may recommend a low-cost tyre with a strong carcass in order to allow a large number of tyre remould operations. The availability of this data in real time allows the fleet manager to operate with a small stock of spare tyres since the system is able to forecast the end of the working life of the tyres.

The Applicants have filed European patent application No. 00 EP-103712.6 which describes a sensor designed to measure the deformations of a moving tyre. This sensor, which is combined with a device for detecting the number of revolutions of the wheel on which it is mounted, is able to detect further information on the tyre, in addition to that described above, such as, for example:

tyre temperature;
tyre inflation pressure;
vertical, longitudinal and transverse forces acting on the tyre;
tread wear.

On the basis of this information, which is preferably stored in the sensor or in the vehicle control unit or detected continuously by means of a system for remote transmission of this data (GPS), it is possible to obtain further indices characterizing the tyres. The indices thus calculated are able to provide information able to ensure, for example, greater active safety for the vehicle drivers, greater care of the vehicle or greater punctuality in the delivery of merchandise loaded on the vehicles, due to continuous monitoring of defects.

Further information may be obtained, for example, for the following: monitoring of the correct distribution of the load on the vehicle, monitoring of the merchandise transported (maximum weight), choice of the best route to be followed in terms of travel wear, fuel consumption, mechanical components, etc.

The invention claimed is:

1. A method for monitoring tyres fitted to vehicles of a fleet of vehicles comprising:
   parking a vehicle of the fleet of vehicles at a predetermined position of a parking area; said vehicle being fitted with a tyre;
   detecting data from a sensor disposed inside the tyre;
   sending the data to a central processing unit located at a tyre supplier premises remote from said parking area via a telecommunications network;
   causing automatic processing of the data by the central processing unit to obtain at least one value for an index characterizing the tyre during use of the tyre; and
   sending the at least one value from the central processing unit to a local processing unit located at said parking area via the telecommunications network;
   wherein the data from the sensor comprises:
   a code identifying the tyre; and
   at least one item regarding a state of the tyre.

2. The method of claim 1, wherein the at least one value comprises an operating cost of the tyre.

3. The method of claim 1, wherein causing automatic processing comprises decoding the data.

4. The method of claim 3, wherein decoding the data comprises:
   comparing the detected data with information contained in a database; and
   updating the database based on the detected data.

5. The method of claim 3, wherein decoding the data comprises:
   comparing the detected data with information contained in a database; and
   updating the database with the detected data.

6. The method of claim 1, wherein the at least one item comprises a number of kilometers traveled by the tyre.

7. The method of claim 1, wherein detecting data from the sensor comprises:

detecting information regarding a number of kilometers traveled by the vehicle; and associating with the vehicle tyre the information regarding the number of kilometers traveled by the vehicle.

8. The method of claim 1, wherein detecting data from the sensor comprises:

decoding the data in the local processing unit;

wherein the local processing unit is connected to the central processing unit using the telecommunications network.

9. The method of claim 8, wherein decoding the data comprises:

comparing the detected data with information contained in a database; and updating the database based on the detected data.

10. The method of claim 8, wherein decoding the data comprises:

comparing the detected data with information contained in a database; and updating the database with the detected data.

11. The method of claim 1, wherein the at least one value comprises at least one of an operating cost of the tyre, an average number of remoulds of the tyre, an average duration of use of the tyre, and a distance travelled by the tyre per unit of time.

12. The method of claim 1, wherein the parking area and the local processing unit are located at a location associated with a manager of the fleet of vehicles.

13. A system for monitoring tyres fitted to vehicles of a fleet of vehicles, comprising:

a device for detecting data from a sensor disposed inside a tyre, the tyre being fitted to a vehicle, the vehicle being one of the fleet of vehicles and being parked at a predetermined position in a parking area;

a central processing unit, the central processing unit being configured to be located at a tyre supplier premises, the central processing unit being configured to receive the detected data via a telecommunications network, wherein the data from the sensor comprises:

a code identifying the tyre; and at least one item regarding a state of the tyre, wherein the central processing unit causes automatic processing of the detected data, and wherein the central processing unit generates at least one value for an index characterizing the tyre during use of the tyre; and a local processing unit configured to be located at said parking area and configured to receive the at least one value from the central processing unit via the telecommunications network.

14. The system of claim 13, wherein the local processing unit decodes the data, and wherein the local processing unit transmits the decoded data to the central processing unit using the telecommunications network.

15. The system of claim 13, wherein the at least one item comprises:

a number of tread band remoulds carried out on a carcass of the tyre;

a number of kilometers traveled by each tread band remoulded on the tyre; and a number of kilometers traveled by the carcass of the tyre.

16. The system of claim 13, wherein the device comprises:

a control unit disposed on the vehicle, wherein the control unit communicates with the sensor for detecting a number of kilometers traveled by the vehicle.

17. The system of claim 13, wherein the device comprises:

a control unit disposed on the vehicle; and the sensor is disposed inside a carcass of the tyre;

wherein the control unit communicates with the sensor for detecting a number of kilometers traveled by the vehicle.

18. The system of claim 13, further comprising:

a database;

wherein parameters stored in the database comprise:

a number of tread band remoulds carried out on a carcass of the tyre;

a cost of remoulding the tyre;

a number of kilometers traveled by each tread band remoulded on the tyre;

a number of kilometers traveled by the carcass of the tyre; and a position of the tyre on the vehicle.

19. The system of claim 18, wherein the central processing unit comprises the database.

20. The system of claim 18, wherein the local processing unit comprises the database.

21. The system of claim 13, wherein the sensor comprises a device for counting a number of kilometers traveled by the tyre.

22. The system of claim 13, wherein the sensor is disposed inside a carcass of the tyre, and wherein the sensor comprises a device for counting a number of kilometers traveled by the tyre.

23. The system of claim 13, wherein the sensor comprises a device for storing the detected data.

24. The system of claim 13, wherein the at least one value comprises at least one of an operating cost of the tyre, an average number of remoulds of the tyre, an average duration of use of the tyre, and a distance travelled by the tyre per unit of time.

25. The system of claim 13, wherein the parking area and the local processing unit are located at a location associated with a manager of the fleet of vehicles.

* * * * *